United States Patent
Kang

[11] Patent Number: 5,230,483
[45] Date of Patent: Jul. 27, 1993

[54] REEL TORQUE DEVICE FOR VIDEO CASSETTE TAPE RECORDER

[75] Inventor: Kwang Y. Kang, Kyungki, Rep. of Korea

[73] Assignee: Goldstar Co., Ltd., Seoul, Rep. of Korea

[21] Appl. No.: 780,194

[22] Filed: Oct. 22, 1991

[30] Foreign Application Priority Data

Oct. 29, 1990 [KR] Rep. of Korea ............... 17366/1990

[51] Int. Cl.⁵ ............................................. G11B 15/32
[52] U.S. Cl. .................................................... 242/201
[58] Field of Search ............... 242/201, 202, 205, 206, 242/208, 209; 360/96.3, 96.4

[56] References Cited

U.S. PATENT DOCUMENTS

| | | | |
|---|---|---|---|
| 2,675,974 | 4/1954 | Jones | 242/205 |
| 4,173,320 | 11/1979 | Schatteman | 242/201 X |
| 4,423,847 | 1/1984 | Yamaguchi et al. | 242/201 X |
| 4,711,410 | 12/1987 | Gwon | 242/201 |
| 4,936,524 | 6/1990 | Hüutter | 242/201 |
| 5,003,418 | 3/1991 | Yang | 360/96.4 |

*Primary Examiner*—Daniel P. Stodola
*Assistant Examiner*—John P. Darling
*Attorney, Agent, or Firm*—Birch, Stewart, Kolasch & Birch

[57] ABSTRACT

A reel torque device for a video cassette tape recorder including a middle gear assembly having a single clutch mechanism functioning to convert the drive force from an idler mechanism into a desired torque and transmit it. The single clutch mechanism includes a frictional plate fitted around a middle boss and provided with at the lower surface with a felt, a flange fitted around the middle boss beneath the frictional plate so as to be selectively in contact with the felt, a compression coil spring interposed between the middle gear and the frictional plate and adapted to urge downwardly the frictional plate away from the middle gear, and a middle pulley fitted around the flange and connected with a drive mechanism by a belt and adapted to be upwardly and downwardly moved with respect to the flange by lifting mechanism so as to convert the drive force of said drive mechanism into a torque which varies depending on the rotation direction of drive mechanism and transmit it. With this construction, the overall construction of the recorder is simplified, thereby enabling compactness and lightness thereof.

4 Claims, 6 Drawing Sheets

REEL TORQUE DEVICE FOR VIDEO CASSETTE TAPE RECORDER

BACKGROUND OF THE INVENTION

1. Field of the Invention

The present invention relates to a reel torque device for a video cassette tape recorder, and more particularly to a reel torque device for a video cassette tape recorder wherein a single clutch mechanism is used for transmitting drive forces of different torques to a supply reel and a take-up reel.

2. Description of Related Art

Figure 1:
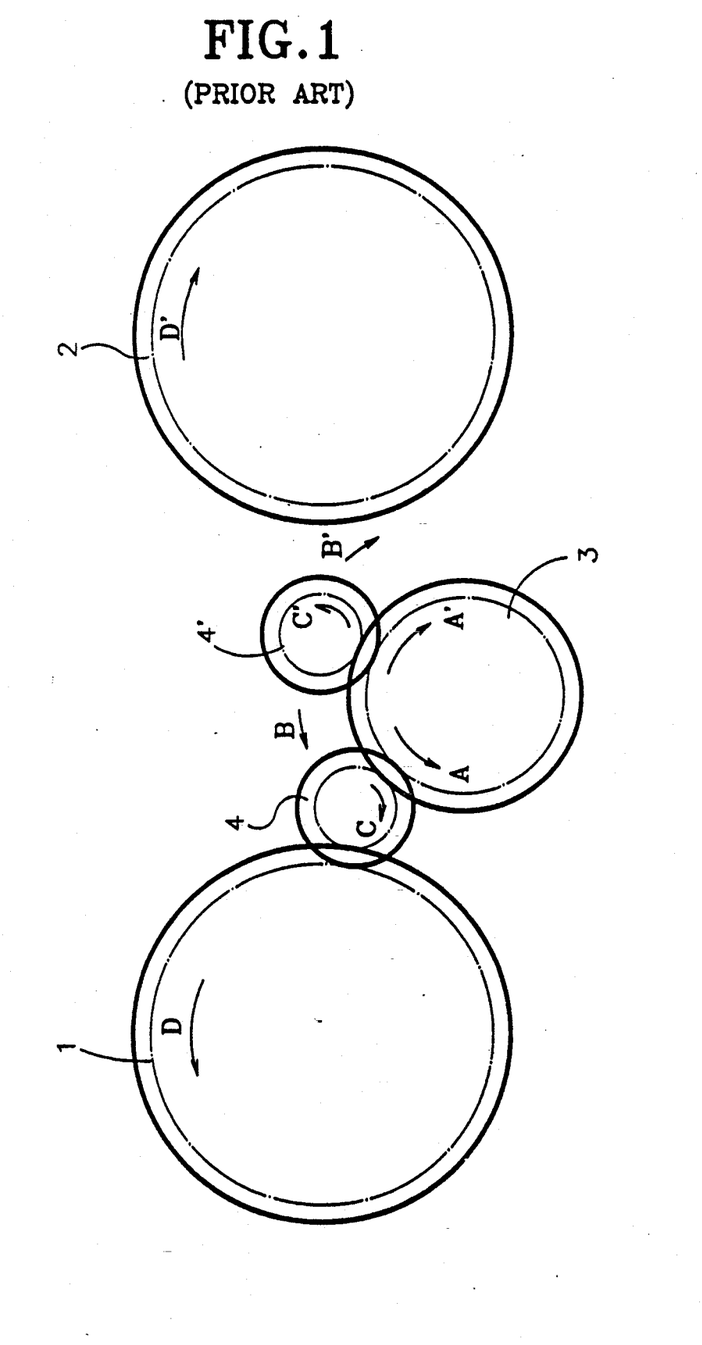
FIG. 1 is a plan view schematically illustrating a reel drive force transmitting system of a conventional video cassette tape recorder.

Referring to FIG. 1, there is shown a generally used video cassette tape recorder. As shown in the drawing, the recorder comprises a supply reel gear 1, a take-up clutch gear 2, a middle gear 3 disposed between the supply reel gear 1 and the take-up clutch gear 2 to rotate by a capstan motor (not shown), and a supply idler gear 4 and a take-up idler gear 4' disposed at both sides of the middle gear 3 to engage always with the middle gear 3 and adapted to selectively engage the supply reel gear 1 and the take-up clutch gear 2 with the middle gear 3, depending on the rotation direction of the middle gear 3, respectively. According to this construction, the supply reel gear 1 and the take-up clutch gear 2 are selectively rotated by the rotation of the middle gear 3.

That is, as the middle gear 3 rotates in the direction of the arrow A indicated in FIG. 1, that is in a counter-clockwise direction, the supply idler gear 4 rotates by itself in the direction of the arrow C, that is in clockwise direction, about its center and simultaneously moves along the periphery of the middle gear 3 about the center of middle gear 3 in the direction of the arrow B, that is counter-clockwise. As a result, the idler gear 4 engages with the supply reel gear 1, thereby causing the supply reel gear 1 to rotate in the direction of the arrow D, that is in the counter-clockwise direction. On the other hand, as the middle gear 3 rotates in the direction of the arrow A' indicated in FIG. 1, that is in the clockwise direction, the take-up idler gear 4' rotates by itself in the direction of the arrow C', that is in the counter-clockwise, about its center and simultaneously moves along the periphery of the middle gear 3 about the center of middle gear 3 in the direction of the arrow B', that is in the clockwise direction. As a result, the idler gear 4' engages with the take-up clutch gear 2, thereby causing the take-up clutch gear 2 to rotate clockwise in the direction of the arrow D'.

Generally, the torque required for rotating the supply reel gear 1 should be higher than that required for rotating the take-up clutch gear 2.

A typical example of generally used reel torque devices of video cassette tape recorders will now be described in conjunction with FIGS. 1 and 2.

Figure 2:
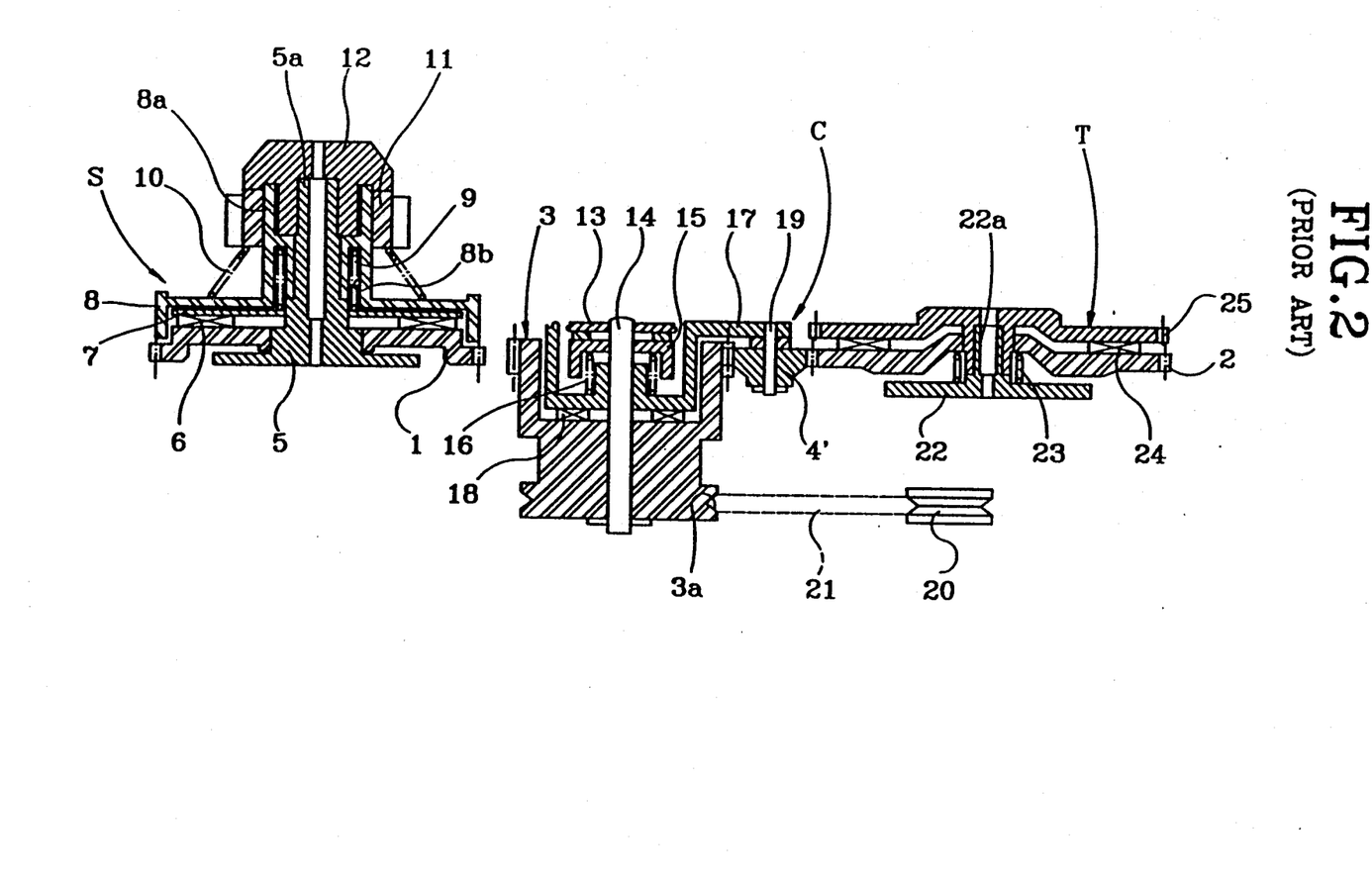
FIG. 2 is a sectional view of a reel torque device of a conventional video cassette tape recorder.

As shown in FIGS. 1 and 2, the reel torque device mainly comprises a supply reel table S, a middle gear assembly C, and a take-up reel table T. The supply reel table S includes a reel body 5 having an upright shaft portion 5a. Around the upright shaft portion 5a of the reel shaft 5, the supply reel gear 1, a frictional plate 7 provided at the lower surface thereof with a felt 6 and a reel disc 8 are fitted, in turn. The reel disc 8 has a shaft portion 8a provided with a recess 8b. In the recess 8b, a compression coil spring 9 is disposed and adapted to always urge the felt 6 of the frictional plate 7 against the upper surface of the supply reel gear 1. A reel cap 12 is closely fitted around the upper end of the shaft portion 5a of reel body 5. Around the shaft portion 8a of reel disc 8, a reel sleeve 11 and a compression coil spring 10 are disposed between the reel cap 12 and the lower portion of the reel of the reel disc 8. The compression coil spring 10 functions to urge the reel sleeve 11 against the reel cap 12.

On the other hand, the middle gear assembly C includes the middle gear 3 rotatably mounted to a shaft 14 and provided with an upper recess. To the upper end of the shaft 14, a main base plate 13 is fixedly mounted. In the recess of the middle gear 3 and beneath the main base plate 13, a spring guide 15, a compression coil spring 16, an idler arm 17 and a felt 18 are disposed, in turn, around the shaft 14. The idler arm 17 has at the middle end thereof a pair of downwardly extending shafts 19 (in FIG. 2, only one shaft is shown). To the shafts 19, the supply idler gear 4 (not shown in FIG. 2) and the take-up idler gear 4' are mounted to engage always with the middle gear 3 and adapted to selectively engage the supply reel gear 1 and the take-up clutch gear 2 with the middle gear 3, depending on the rotation direction of the middle gear 3, respectively. A belt guide groove 3a is formed at the lower portion of the middle gear 3 so that the middle gear 3 is connected with the capstan pulley 20 by means of a belt 21.

Also, the take-up reel table T has a reel body 22 having an upright shaft portion 22a. Around the shaft portion 22a of the reel body 22, the take-up clutch gear 2 is fitted. Above the take-up clutch gear 2, a take-up reel gear 25 is fitted around the shaft portion 22a of the reel body 22. A felt 24 is disposed at the lower surface of the take-up reel gear 25. Between the reel body 22 and the take-up clutch gear 2, a compression coil spring 23 is disposed and adapted to urge the take-up clutch gear 2 against the felt 24 attached to the lower surface of the take-up reel gear 25.

In the above construction of a conventional reel torque device, the drive force of the capstan motor is transmitted to the middle gear 3, via the capstan pulley 20 and the belt 21, thereby causing the middle gear 3 to rotate. According to the rotation of middle gear 3, the idler arm 17 rotates clockwise or counter-clockwise about the center shaft 14, by virtue of the frictional contact generated between the middle gear 3 and the idler arm 17 and resiliently supported by the compression coil spring 16.

Therefore, as the middle gear 3 rotates in the direction of the arrow A of FIG. 1, the supply idler gear 4 engages with the supply reel gear 1, so that the rotational force of the middle gear 3 is transmitted to the reel disc 8, via the idler arm 17, the supply idler gear 4, the supply reel gear 1, the felt 6 and the frictional plate 7. At this time, the torque for transmitting the rotational force is determined by the relative rotation torque generated between the supply reel gear 1 and the frictional plate 7 by the frictional contact between the felt 6 and the supply reel gear 1.

On the other hand, as the middle gear 3 rotates in the direction of the arrow A' of FIG. 1, the take-up idler gear 4' engages with the take-up clutch gear 2, so that the rotational force of the middle gear 3 is transmitted to the reel disc 8, via the idler arm 17, the take-up idler gear 4', the take-up clutch gear 1, the felt 24 and the take-up reel gear 25. At this time, the torque for transmitting the rotational force is determined by the relative rotation torque generated between the take-up clutch gear 2 and the take-up reel gear 25 by the frictional contact between the felt 25 and the take-up clutch gear 2.

That is, the rotation torque of the supply reel table S can be adjusted to be higher than the rotation torque of the take-up reel table T, by properly adjusting the modulus of elasticity of the compression coil spring S constituting a part of the supply reel table S and the coefficient of friction of the felt constituting a part of the take-up reel table T.

However, the construction of the conventional device is complex, since the supply reel table 8 and the take-up reel table T include torque devices, respectively, thereby causing the manufacture cost to be increased and the productivity to be reduced. As a result, it is impossible to apply the conventional device to camera-integrated video cassette tape recorders (also, referred to as camcorders) which require compact and light construction.

In the conventional device, rotation transmission systems between respective torque devices and respective parts receiving the drive force from the belt 21 have a long rotation force transmitting distance. Accordingly, a relatively large load is generated in initial driving operations, for example, in the conversion from stop mode to rewinding operation mode, thereby causing the belt 21 to slip and thereby wear. Consequently, the life of belt 21 is reduced.

SUMMARY OF THE INVENTION

Therefore, an object of the invention is to provide a reel torque device for a video cassette tape recorder wherein a single clutch mechanism is used for providing torque forces required in driving supply and take-up reel tables, without respective torque devices therefor, thereby enabling the overall construction to be simplified.

In accordance with the present invention, this object can be accomplished by providing a reel torque device for a video cassette tape recorder comprising: a supply reel table having a single reel disc and a supply reel gear integrally formed with the single reel disc; a take-up reel table having a reel disc and a take-up reel gear integrally formed with the reel disc; an idler mechanism mounted to the upper portion of a center shaft and adapted to selectively transmit a torque to the supply reel gear and said take-up reel gear; and a middle gear assembly having a single clutch mounted to the lower portion of the center shaft and functioning to convert the drive force from the idler mechanism into a desired torque and transmit it.

In accordance with the present invention, the single clutch mechanism comprises a middle boss having a lower portion provided at the upper end with the middle gear fitted thereon, a frictional plate fitted around the middle boss and provided at the lower surface with a felt attached therto, a flange fitted around the middle boss beneath the frictional plate so as to be selectively in contact with the felt, a compression coil spring interposed between the middle gear and the frictional plate and adapted to urge the frictional plate downward away from the middle gear, and a middle pulley fitted around the flange and connected with a drive mechanism by means of a belt and adapted to be upwardly and downwardly moved with respect to the flange by lifting means so as to convert the drive force of the drive mechanism into a torque which varies depending on the rotation direction of drive mechanism and transmit it.

In accordance with the present invention, the lifting mechanism comprises a pair of opposite slant guide grooves formed on both sides of the outer surface of the lower portion of the flange, respectively, and a pair of opposite guide protrusions formed on both sides of the inner surface of the center hole of the middle pulley and inserted into respective slant guide grooves to be guided thereby, respectively.

BRIEF DESCRIPTION OF THE DRAWINGS

Other object and aspects of the invention will become apparent from the following description of embodiments with reference to the accompanying drawings in which.

DETAILED DESCRIPTION OF THE PREFERRED EMBODIMENTS

Figure 3:
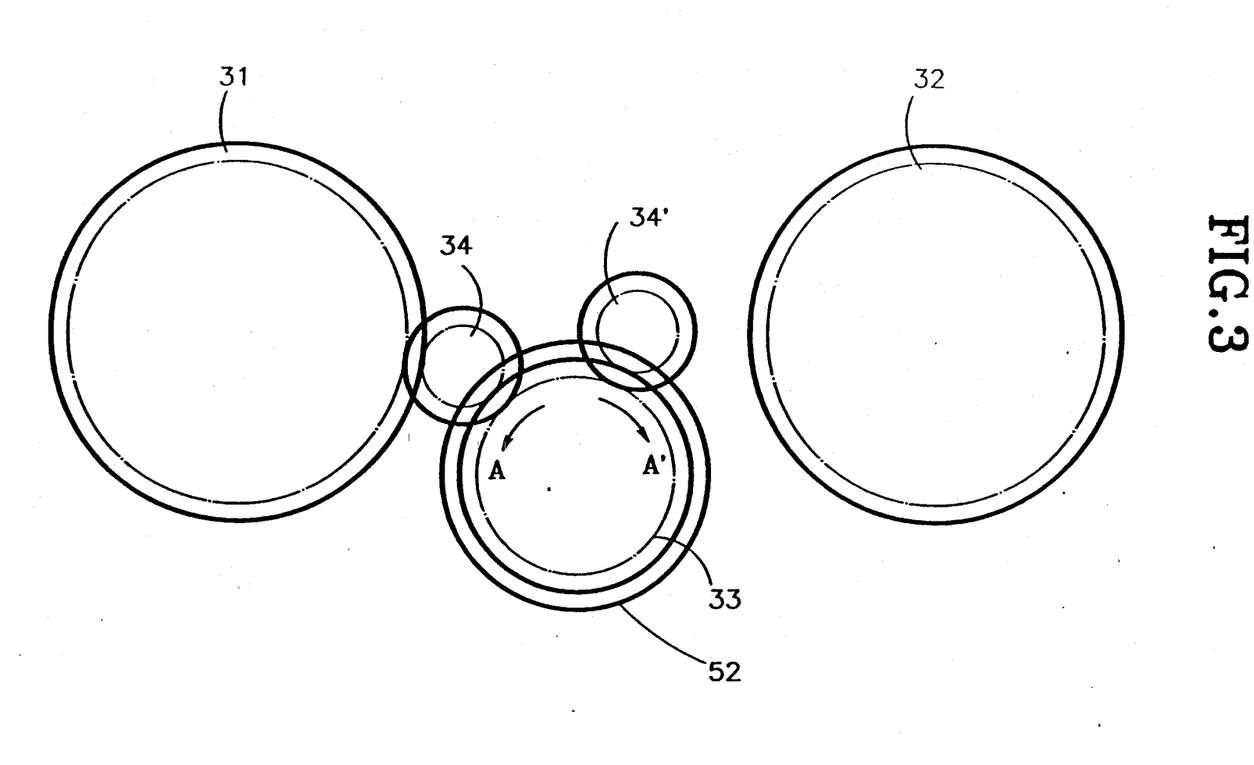
FIG. 3 is a plan view schematically showing a reel torque device of a video cassette tape recorder in accordance with the present invention.

FIG. 3 is a plan view schematically showing a reel torque device of a video cassette tape recorder in accordance with the present invention. As shown in the drawing, the reel torque device comprises a supply reel gear 31, a take-up reel gear 32, a middle gear 33 rotatably disposed between the supply reel gear 31 and the take-up reel gear 32, and a supply idler gear 34 and a take-up idler gear 34' disposed at both sides of the middle gear 33 to engage always with the middle gear 33 and adapted to selectively engage the supply reel gear 31 and the take-up reel gear 32 with the middle gear 33, depending on the rotation direction of the middle gear 33, respectively.

Figure 4:
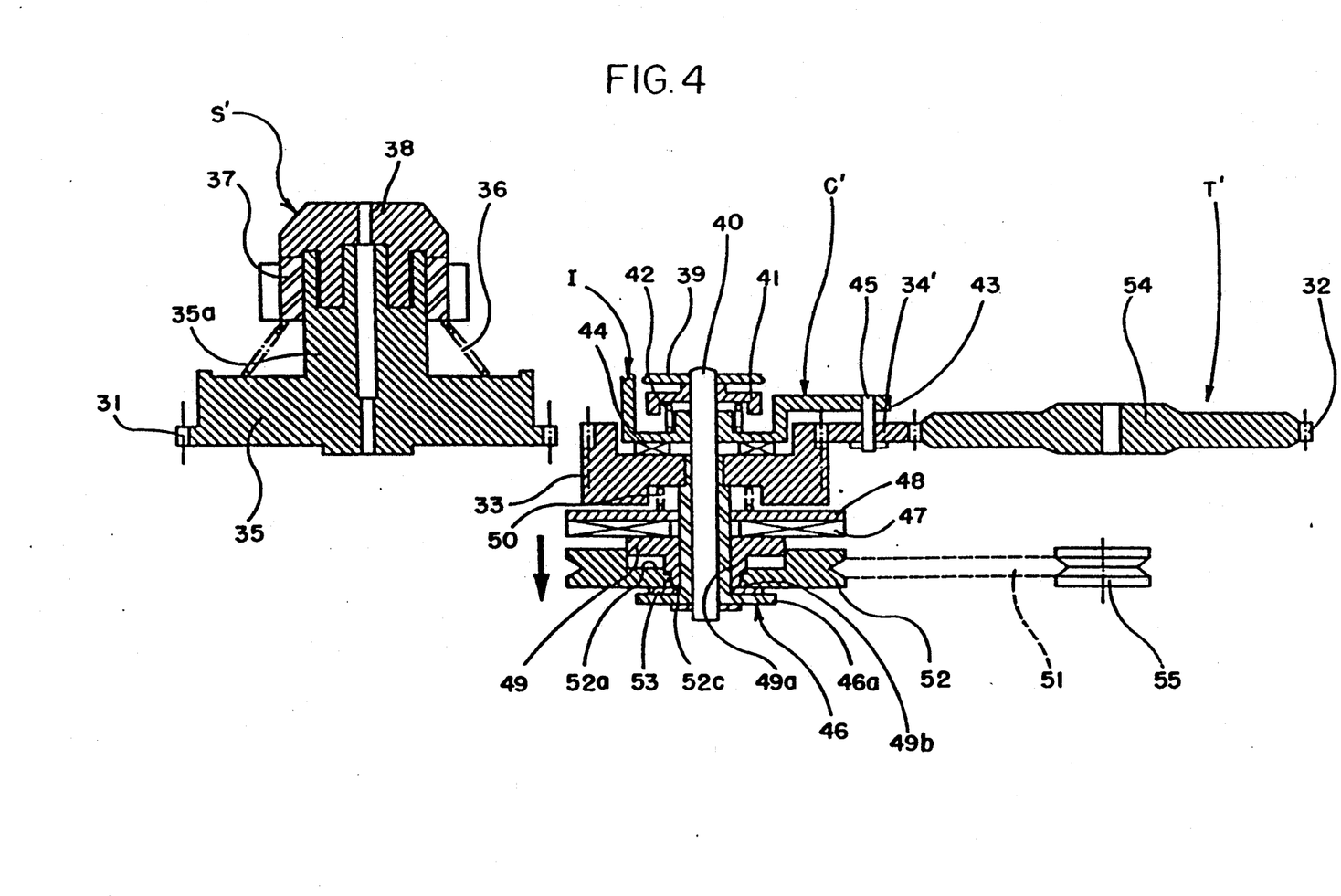
FIGS. 4 and 5 are sectional views illustrating the construction of the reel torque device according to the present invention.
Figure 5:
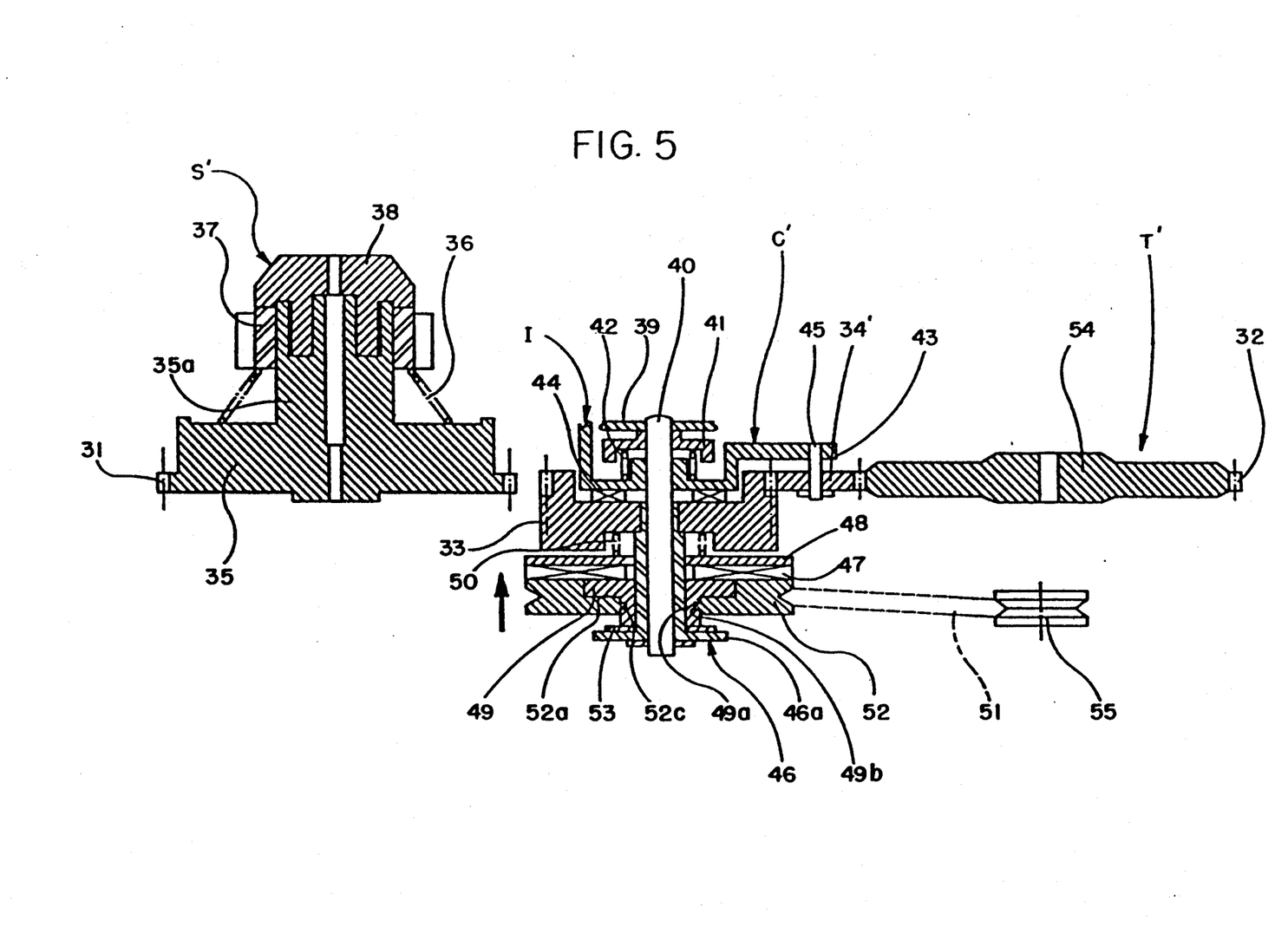
Figure 6:
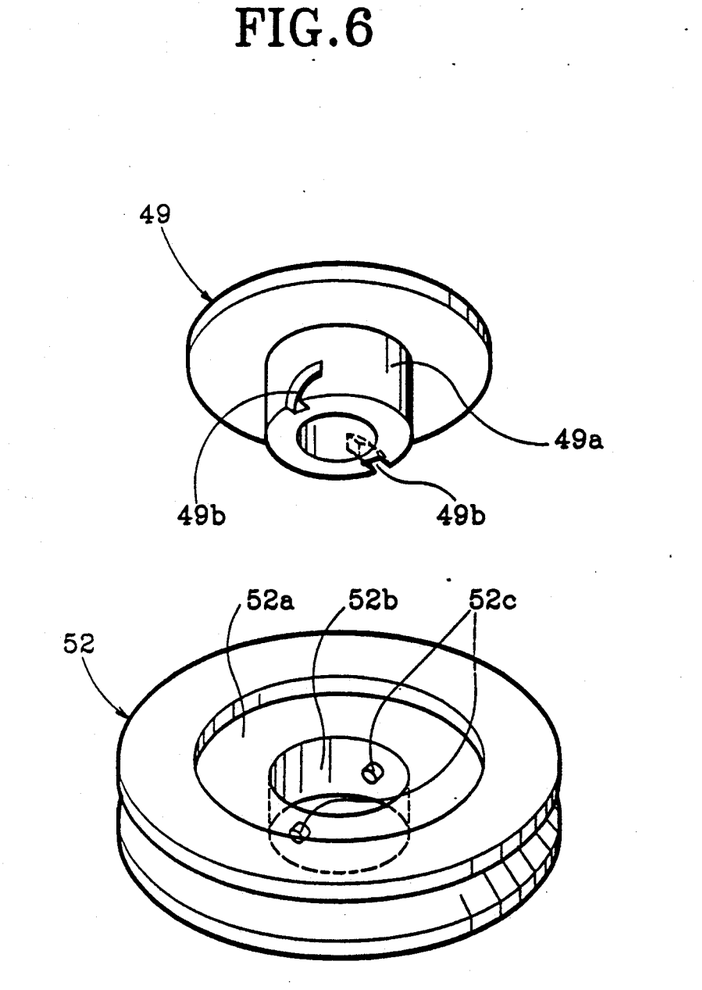
FIG. 6 is an exploded perspective view showing partially a single clutch mechanism according to the present invention.

On the other hand, FIGS. 4 and 5 are sectional views illustrating the construction of the reel torque device according to the present invention, while FIG. 6 is an exploded perspective view showing partially a single clutch mechanism according to the present invention. As shown in the drawings, the reel torque device of the present invention mainly comprises a supply reel table S', a middle gear assembly C' and a take-up reel table T'.

The supply reel table S' includes a single reel disc 35 having a center shaft portion 35a and provided at its peripheral surface with the supply reel gear 31. A reel cap 38 is closely fitted around the upper end of the shaft portion 35a of reel disc 35. Around the shaft portion 35a of reel disc 35, a reel sleeve 37 and a compression coil spring 36 are disposed between the reel cap 38 and the lower portion of the reel of the reel disc 35. The compression coil spring 36 functions to urge the reel sleeve 37 against the reel cap 38.

On the other hand, the middle gear assembly C' includes an idler mechanism I mounted beneath a main base plate 39 to the upper portion of a center shaft 40 fixed to the main base plate 39.

The idler mechanism I is of a conventional type which comprises the middle gear 33 rotatably mounted to the shaft 40 and provided with an upper recess. In the recess of the middle gear 33 and beneath the main base plate 39, a spring guide 41, a compression coil spring 42, an idler arm 43 and a felt 44 are disposed, in turn, around the shaft 40. The idler arm 43 has at the one end thereof a pair of downwardly extending shafts 45 (in FIG. 4, only one shaft is shown). To the shafts 45, the supply idler gear 34 (not shown in FIG. 4) and the take-up idler gear 34' are mounted to engage always with the middle gear 33 and adapted to selectively engage the supply reel gear 31 and the take-up reel gear 32 with the middle gear 33, depending on the rotation direction of the middle gear 33, respectively.

Beneath the idler mechanism I, a single clutch mechanism is disposed which is adapted to convert the drive force of a capstan motor into a suitable torque and transmit the torque to the idler mechanism I. The single clutch mechanism comprises a middle boss 46 having a lower portion provided with a flange portion 46a and an upper end fitting the middle gear 33 thereon, a frictional plate 48 fitted around the middle boss 46 and provided with at the lower surface with a felt 47 attached thereto, a flange 49 fitted around the middle boss 46 beneath the frictional plate 48 so as to be in contact with the felt 47, a compression coil spring 50 interposed between the middle gear 33 and the frictional plate 48 and adapted to urge downwardly the frictional plate 48 away from the middle gear 33, a middle pulley 52 fitted around the flange 49 and connected with a capstan pulley 55 by means of a belt 51, and a washer 53 interposed between the flange portion 46a of the middle boss 46 and the flange 49 and adapted to smoothly rotate the flange 49 and the middle pulley 52.

The middle pulley 52 fitted around the flange 49 is movable upwardly and downwardly a certain distance along the height of the flange 49, by a lifting means. At its lowered position shown in FIG. 4, the middle pulley 52 is not in contact with the felt 47. On the other hand, the middle pulley 52 is in contact with the felt 47 at its lifted position. In the latter state, the inner step 52a is also in contact with the lower surface of the flange 49.

As shown in FIG. 6, the lifting means comprises a pair of opposite slant guide grooves 49b formed on the outer surface of the lower portion 49a of flange 49 and a pair of opposite guide protrusions 52c formed on the inner surface of the center hole 52b of middle pulley 52 and inserted into respective slant guide grooves 49b to be guided thereby.

On the other hand, the take-up reel table T' includes a single reel disc 54 provided at its peripheral surface with the take-up reel gear 32 which is selectively engaged with the take-up idler gear 34'.

The operation of the reel torque device having the above-mentioned construction according to the present invention will now be described in detail.

As the middle pulley 52 rotates in the direction of the arrow A' of FIG. 3, that is in the clockwise direction, it is maintained at its lowered position since the guide protrusions 52c are maintained at respective lower ends of the slant guide grooves 49b of flange 49. Accordingly, the middle pulley 52 is separated from the flange 49 and the felt 47, as shown in FIG. 4. At this state, the rotation torque of the middle pulley 52 is transmitted to the middle gear 33, by virtue of the frictional contact generated between the flange 49 and the felt 47 by the resilience of the compression coil spring 50, thereby causing the middle gear 33 to rotate. According to the rotation of the middle gear 33, the idler arm 43 rotates about the center shaft 40, by virtue of the frictional contact generated between the middle gear 33 and the idler arm 43. As the idler arm 43 rotates, the take-up idler gear 34' is engaged with the take-up reel gear 32, as in the manner described in conjunction with the conventional reel torque device. As a result, a desired reel torque can be transmitted to the take-up reel table T'.

On the other hand, when the middle pulley 52 rotates in the direction of the arrow A of FIG. 3, that is in the clockwise direction, it is maintained at its lifted position since the guide protrusions 52c are maintained at respective upper ends of the slant guide grooves 49b of flange 49. Accordingly, the middle pulley 52 is in contact with the felt 47 under the condition that its inner step 52a contacts the lower surface of the flange 49, as shown in FIG. 5. As a result, it is possible to transmit increased rotation torque to the middle gear 33, over the case when the middle pulley 52 rotates at its lowered position. According to the rotation of the middle gear 33, the idler arm 43 rotates counter-clockwise about the center shaft 40, by the same operation as that of the above-mentioned case. As the idler arm 43 rotates counter-clockwise, the take-up idler gear 34 is engaged with the supply reel gear 31, as in the manner described in conjunction with the conventional reel torque device. As a result, a desired reel torque can be transmitted to the supply reel table S'.

As apparent from the above description, the present invention provides a reel torque device wherein a single clutch device is used which is substituted for the existing torque devices required for respective supply and take-up reel tables, whereby the overall construction is simplified. Accordingly, it is possible to apply the reel torque device to the appliances requiring compactness and lightness, such as a compact camera-integrated video cassette tape recorder. In addition, it is possible to reduce the wear of the belt caused by its slippage generated in operation mode conversion, thereby lengthening the life of the belt.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A reel torque device for a video cassette tape recorder comprising:

a supply reel table having a single reel disc and a supply reel gear integrally formed with said single reel disc;

a take-up reel table having a reel disc and a take-up reel gear integrally formed with said reel disc;

an idler mechanism mounted to the upper portion of a center shaft and adapted to selectively transmit a torque to said supply reel gear and said take-up reel gear;

means for generating a drive force; and a middle gear assembly having a single clutch means mounted to the lower portion of said center shaft and functioning to convert said drive force into torque and transmit the torque to the idler mechanism which in turn transmits torque to the supply and take up reel gears wherein said single clutch means includes a middle boss having the middle gear fitted at the upper end thereof, a frictional plate fitted around said middle boss and provided with felt on the lower surface thereof, a flange fitted around the middle boss beneath said frictional plate, a coil spring interposed between the middle gear and the frictional plate, and adapted to urge the frictional plate downward away from the middle gear, and a middle pulley fitted around the flange and connected with said means for generating a drive force by means of a belt and adapted to be upwardly and downwardly moved with respect to the flange by said lifting means so as to convert the drive force of said means for generating a drive force into a torque which varies depending on the rotation direction of said middle pulley.

2. The reel torque device in accordance with claim 1, wherein said lifting means includes a pair of opposite slant guide grooves formed on both sides of the outer surface of the lower portion of the flange, respectively, and a pair of opposite guide protrusions formed on both sides of the inner surface of the center hole of the middle pulley and inserted into respective slant guide grooves to be guided thereby, respectively whereby rotation of the middle pulley in a clockwise direction maintains the guide protrusions at a lower end of said guide grooves and rotation of the middle pulley in a counter-clockwise direction maintains the guide protrusions at an upper end of said guide grooves thereby lowering and lifting said middle pulley, respectively.

3. The reel torque device in accordance with claim 1, wherein said means for generating a drive force is a capstan pulley connected to said middle pulley with a belt member.

4. A reel torque device for a video cassette tape recorder comprising:
- a supply reel table having a single reel disc and a supply reel gear integrally formed with said single reel disc;
- a take-up reel table having a reel disc and a take-up reel gear integrally formed with said real disc;
- an idler mechanism mounted to the upper portion of a center shaft and adapted to selectively transmit a torque to said supply reel gear and said take-up reel gear;
- means for generating a drive force; and
- a middle gear assembly functioning to convert said drive force into a desired torque in accordance with an upward and downward movement of a pulley receiving said drive force by means of a belt and transmit the torque to the idler mechanism.

* * * * *